United States Patent Office.

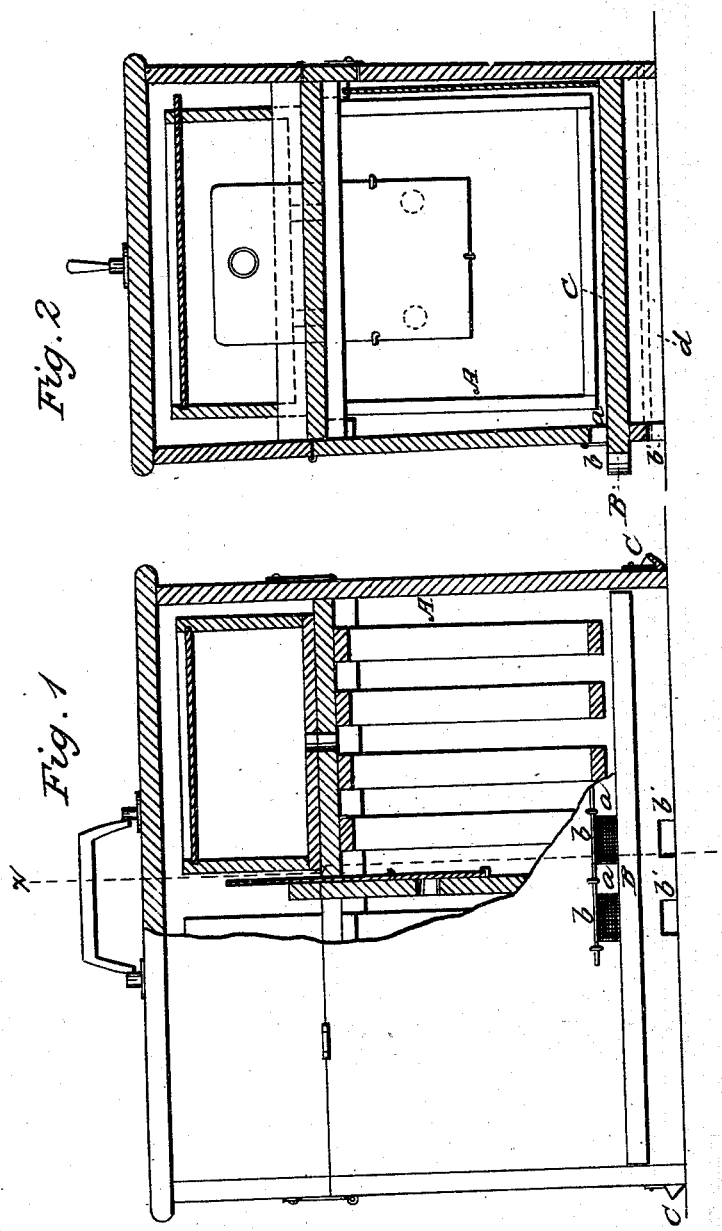

CHARLES McGREW, OF BLOOMINGTON, ILLINOIS.

Letters Patent No. 62,051, dated February 12, 1867.

IMPROVEMENT IN BEE-HIVES.

The Schedule referred to in these Letters Patent and making part of the same.

TO ALL WHOM IT MAY CONCERN:

Be it known that I, CHARLES McGREW, of Bloomington, in the county of McLean, and State of Illinois, have invented a new and improved Bee-Hive; and I do hereby declare that the following is a full, clear, and exact description thereof, which will enable those skilled in the art to make and use the same, reference being had to the accompanying drawings, forming part of this specification, in which—

Figure 1 is a front view of my invention, partly in section.

Figure 2, a transverse vertical section of the same, taken in the line $x$ $x$, fig. 1.

Similar letters of reference indicate corresponding parts.

This invention consists of a bee-hive constructed in such a manner and provided with vessels for the reception of water or other liquids, located in such a position, that the bee-moth will be entrapped and the bees protected from the ravages of that insect.

The hive A I construct of the usual or any proper size, and of any suitable form. The quadrilateral shape, however, I prefer, with the front and rear sides slightly inclined. This, however, is not a new feature in itself. In the front side of the hive, near its lower end, there are made two bee entrances, $a$ $a$, provided with wire-gauze doors, $b$ $b$, which, when closed, admit air into the hive, and at the same time prevent the egress of the bees therefrom. Directly below these openings or entrances $a$ $a$, there is secured a horizontal strip, B, which serves as an alighting board for the bees, and the front of the hive below this strip B is painted white; the sides of the hive are also painted white to about the same height. In the front of the hive, below the strip B, there are made two openings, $b'$ $b'$, and to each side of the hive, at its lower part, there is attached a trough, C, of sheet metal or other material. These troughs contain water or other liquid, in which the miller, in attempting to effect an entrance, falls and is destroyed. The white surfaces at the front and sides of the hive attract the miller, or render such portions of the hive more conspicuous than the other parts, as the visits of the miller are nocturnal. The bottom $c$ of the hive is above the openings $b'$ $b'$, and said openings, therefore, lead into a compartment, $d$, in which a shallow vessel is to be placed, supplied with water or other suitable liquid. The bee entrances $a$ $a$ being above the strip B, and in the dark or unpainted portion of the hive, the millers will not endeavor to effect an entrance through them, but will rather seek it at the white painted portions, and in so doing will fall into the vessels or troughs of liquid prepared for them.

I claim as new, and desire to secure by Letters Patent—

The bottom $c$ above the openings $b'$, leaving the space $d$, in combination with the case A, having water-trough C on its sides, which, with the front space below the alighting board, is painted white, for the purpose described, and operating in the manner as and for the purpose specified.

The above specification of my invention signed by me this 5th day of July, 1866.

CHARLES McGREW.

Witnesses:
W. H. STENNETT,
M. H. McGREW.